United States Patent [19]

Falkenson et al.

[11] Patent Number: 5,042,607

[45] Date of Patent: Aug. 27, 1991

[54] POWER DRIVEN VEHICLE FOR DISABLED

[75] Inventors: Richard Falkenson; Göran Linderoth, both of Göteborg, Sweden

[73] Assignee: INM Industriteknik AB, Sweden

[21] Appl. No.: 460,895

[22] PCT Filed: Jun. 16, 1988

[86] PCT No.: PCT/SE88/00330

§ 371 Date: Feb. 9, 1990

§ 102(e) Date: Feb. 9, 1990

[87] PCT Pub. No.: WO88/10109

PCT Pub. Date: Dec. 29, 1988

[30] Foreign Application Priority Data

Jun. 22, 1987 [SE] Sweden .............................. 8702577

[51] Int. Cl.[5] ......................... B62D 27/06; B62D 1/12

[52] U.S. Cl. .................................. 180/208; 180/6.48; 180/907; 280/DIG. 5; 297/DIG. 4

[58] Field of Search .............. 180/208, 209, 210, 907, 180/6.5, 65.5, 6.48; 297/DIG. 4; 280/657, DIG. 5

[56] References Cited

U.S. PATENT DOCUMENTS

| | | | |
|---|---|---|---|
| 3,053,547 | 9/1962 | Osborne | 180/234 |
| 3,664,450 | 5/1972 | Udden et al. | 180/907 |
| 3,749,192 | 7/1973 | Karchak, Jr. et al. | 180/907 |
| 3,896,891 | 7/1975 | Miltenburg et al. | 180/907 |
| 4,375,840 | 3/1983 | Campbell | 180/907 |
| 4,613,151 | 9/1986 | Kielczewski | 180/907 |
| 4,614,246 | 9/1986 | Masse et al. | 180/6.5 |
| 4,643,446 | 2/1987 | Murphy et al. | 180/907 |
| 4,757,868 | 7/1988 | Cresswell | 180/907 |

FOREIGN PATENT DOCUMENTS 331884 7/1969 Sweden .

*Primary Examiner*—Richard A. Bertsch
*Attorney, Agent, or Firm*—Ostrolenk, Faber, Gerb & Soffen

[57] ABSTRACT

A power driven vehicle for disabled, particularly for children, and which incorportaes a motor driven chassis module, a seat module and an accumulator module, wherein the chassis module incorporates two wheel pair units, which are disconnectable from each other and constitute a first, front wheel unit and a second, rear wheel unit, one of the wheel pair units, preferably the first wheel unit, incorporating two steering and driving units acting individually upon one wheel each, the second wheel unit being composed by a central beam, one end of which is connectable to the first wheel unit and having at its other end a yoke pivotably supported transversely to the longitudinal direction of the vehicle, and having at its free ends wheels supported in bearings, and said seat module being centrally arranged on the beam, whereas said accumulator module is attached on both sides of the beam, between the pairs of wheels.

6 Claims, 5 Drawing Sheets

POWER DRIVEN VEHICLE FOR DISABLED

The present invention relates to a power driven vehicle for the disabled, particularly for children, and which incorporates a motor driven chassis module, a seat module and an accumulator module.

BACKGROUND OF THE INVENTION

Vehicles for disabled children have hitherto at best consisted of diminished size, conventional wheel chairs for adults. These wheel chairs are not adaptable or not readily adaptable to the development of the child, i.e. its physical development as well as the development of its possible handicap, during the childhood; and the wheel chairs therefore neither take into consideration the child's requirement for play, nor do they meet the demands from the nursing staff for ease of handling and low weight.

Wheel chairs for disabled, which are designed in modules are known, e.g. from SE-C-331 884, and they consist of a chassis, incorporating a motor, wheels and battery box, which parts form a continuous unit of large weight. A seat module can be attached to the chassis, which seat module can be common for several different types of chassis, for providing e.g. an indoor wheel chair, a stationary or a semi-stationary chair. Conventional, electrically powered wheel chairs are very heavy and expensive.

PURPOSE AND MOST ESSENTIAL FEATURES OF THE INVENTION

The purpose of the present invention is to provide a wheel chair, which consists of several different parts—modules—, each one being exchangeable for bigger ones so that the wheel chair may "grow" together with the child. The wheel chair with some simple manipulations also be dismantled into easily manageable parts, which make it possible to use the wheel chair indoors as well as outdoors. Due to an exchange system it shall be possible to exchange different modules for bigger modules or for modules particularly adapted concurrently with the development of the child's handicap.

The module system will facilitate service, when it will be possible to replace a defective module, e.g. by the child's parents, without substantial difficulties , so that the wheel chair never must be out of use for any substantial period of time. A further purpose of the invention is to provide a wheel chair, wherein the child can have both floor contact, i.e. participate in activities at floor level, as well as be sitting at a table, whereby the child himself or herself shall be able to adjust not only the height position of the vehicle but also the maneuvering of the entire vehicle. These tasks have been solved in that the chassis module incorporates two wheel pair units, which are disconnectable from each other, a first wheel unit, preferably being a front wheel unit and a second wheel unit, preferably being a rear wheel unit. One of the wheel pair units, preferably the first wheel unit incorporates two steering and driving units acting individually upon one wheel each. The second wheel unit comprises a central beam, one end of which is connectable to the first wheel unit. Its other end a yoke is pivotably supported transversely to the longitudinal direction of the vehicle. Its free ends have wheels supported in bearings. The seat module is centrally arranged on the beam. The accumulator module is attached on both sides of the beam, between the pairs of wheel.

DESCRIPTION OF THE DRAWINGS

The invention hereinafter will be further described with reference to the accompanying drawings, which show some exemplary embodiments.

DESCRIPTION OF THE EMBODIMENTS

Figure 1:
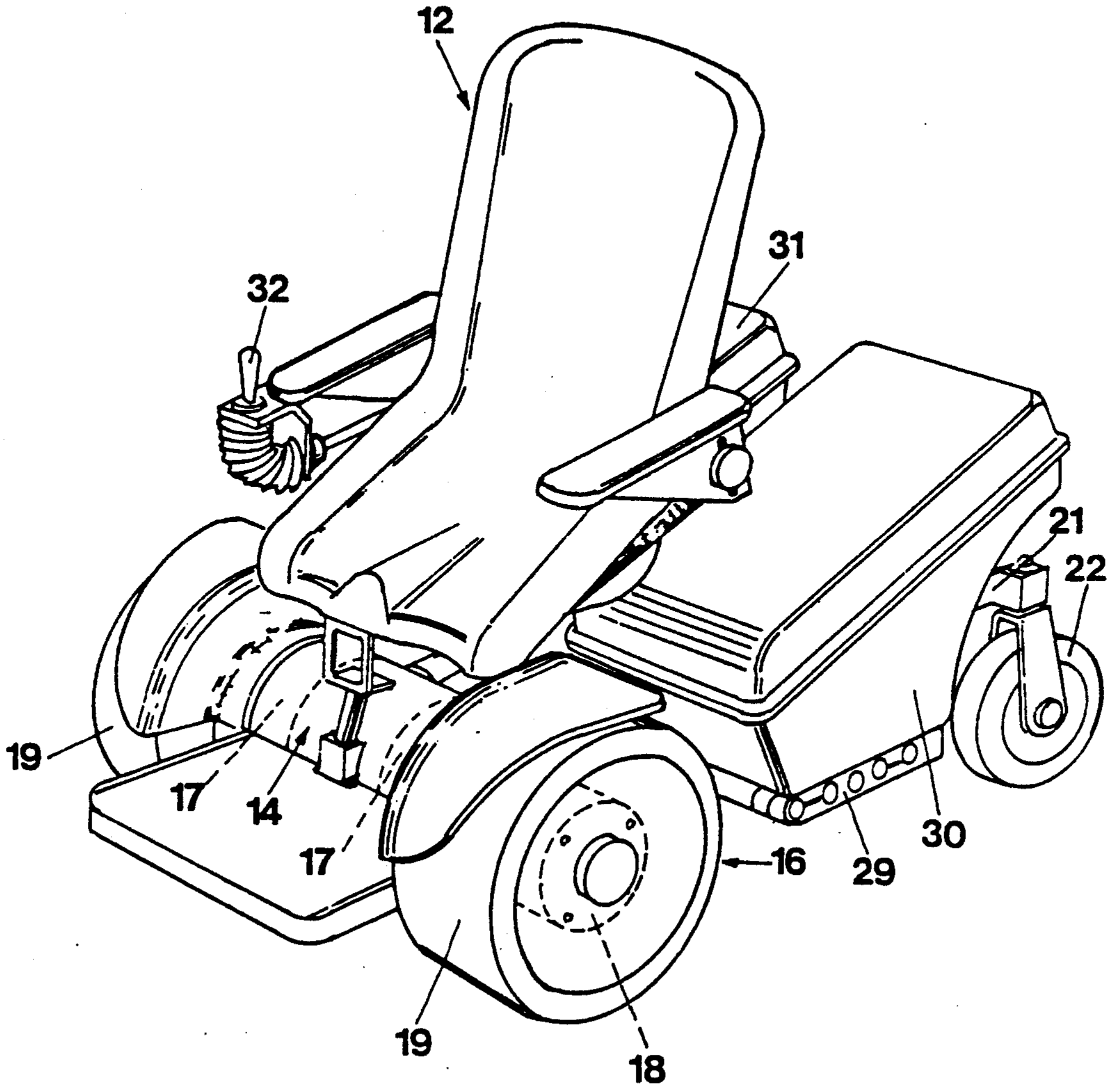
FIG. 1 shows in perspective a wheel chair according to the invention as seen obliquely from the front side thereof.
Figure 2:
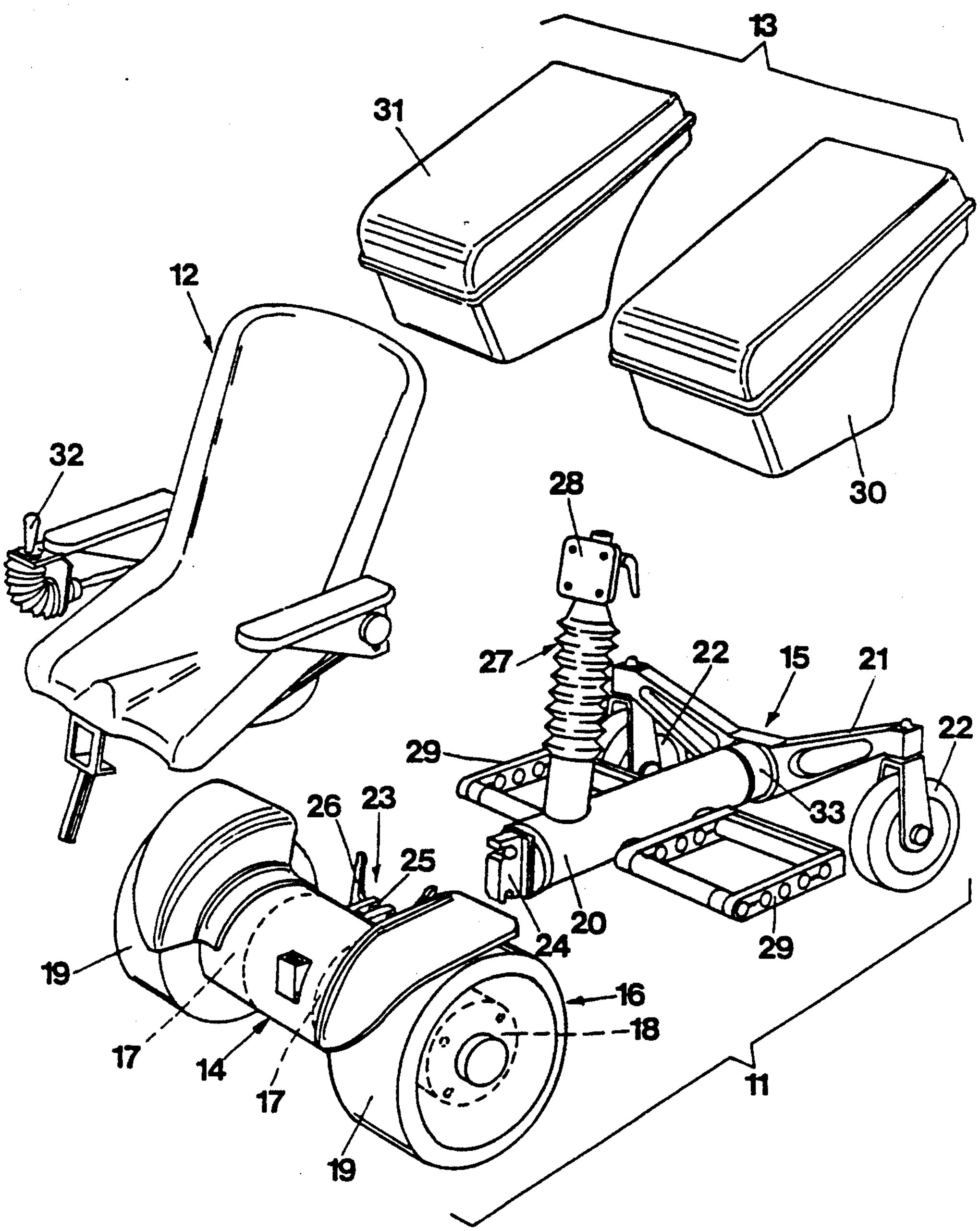
FIG.2 shows in perspective an exploded view of the different modules of which the wheel chair according to FIG. 1 consists.

The wheel chair according to the invention consists of a chassis module 11, a seat module 12 and an accumulator module 13. The chassis module 11 incorporates two wheel pair units 14 and 15, one 14 of which is constituted by a drive unit 16, consisting of two coaxially arranged D.C. servo motors 17, which via one gear box 18 each drives one driving wheel 19 each. The seat module 12 incorporates the implement with which the vehicle shall be used, e.g. a chair if the vehicle shall be a wheel chair. Instead of the chair it is possible to use a robot or the like as the implement.

The second wheel pair unit 15 forming part of the chassis module 11, consists of a central, longitudinal beam 20, having at one end, its rearmost end, a bearing 33 arranged in the axial direction of the beam, on which bearing is pivotably supported a yoke 21 on the at both of its ends supports one wheel 22, which is freely rotatable about a vertical shaft. The beam 20 of the rearmost wheel pair unit at its end facing away from the yoke 21 is interconnectable with the drive unit 16 by means of connecting means 23, consisting of a male portion 24 fitted to the beam and a female portion 25 fitted to the drive unit. The connecting means is a so called quick-coupling, which by a handgrip 26 may be locked thus that the portions are rigidly interconnected.

The beam 20 also forms an attachment at one hand for a column 27, to which the seat module 12 is attachable by means of a connecting device 28 designed as a quick-coupling, and on the other hand for two horizontally arranged attachments 29 for supporting one battery box 30 and 31 each. The column 27 may consist of a longitudinally resilient member forming in effect a gas spring, which is arranged in such a manner, that the connecting device 28 may be adjusted to different levels. The column 27 may also be an electrical actuator, designed so that the seat module 12 can be raised and lowered by the handicapped person.

The maneuvering of the wheel chair is effected by aid of a so called joy stick 32, provided at one arm rest of the seat module 12, thus that it is within comfortable reach for one hand of the disabled child.

At least one of the battery boxes 30 or 31 respectively contains beside the accumulators also an electronic system, having both a steering and a surveillance function. The system incorporates the two motors 17 of the driving unit 14, which e.g. are equipped with optical speed sensing system and electromagnetically operated parking brakes. The system is designed thus that the brakes will be applied against the brake discs as long as the wheel chair is not activated and in this manner the motor shaft is prevented from rotation. The parking brake of the wheel chair thereby is activated and the chair can not move. When the joy stick 32 is moved out from its neutral position an electro magnet will move the brake arm from its braking position and the parking brake is released. In order to avoid the parking brake being applied as soon as the joy stick passes its neutral position there is introduced a time constant in the electronic system, which may be e.g. 5 seconds, during which time the joy stick must be in its neutral position to result in activation of the brake. The parking brake can be mechanically released, but not by playing children, to be certain that the wheel chair shall not begin to move unintentionally.

Figure 3:
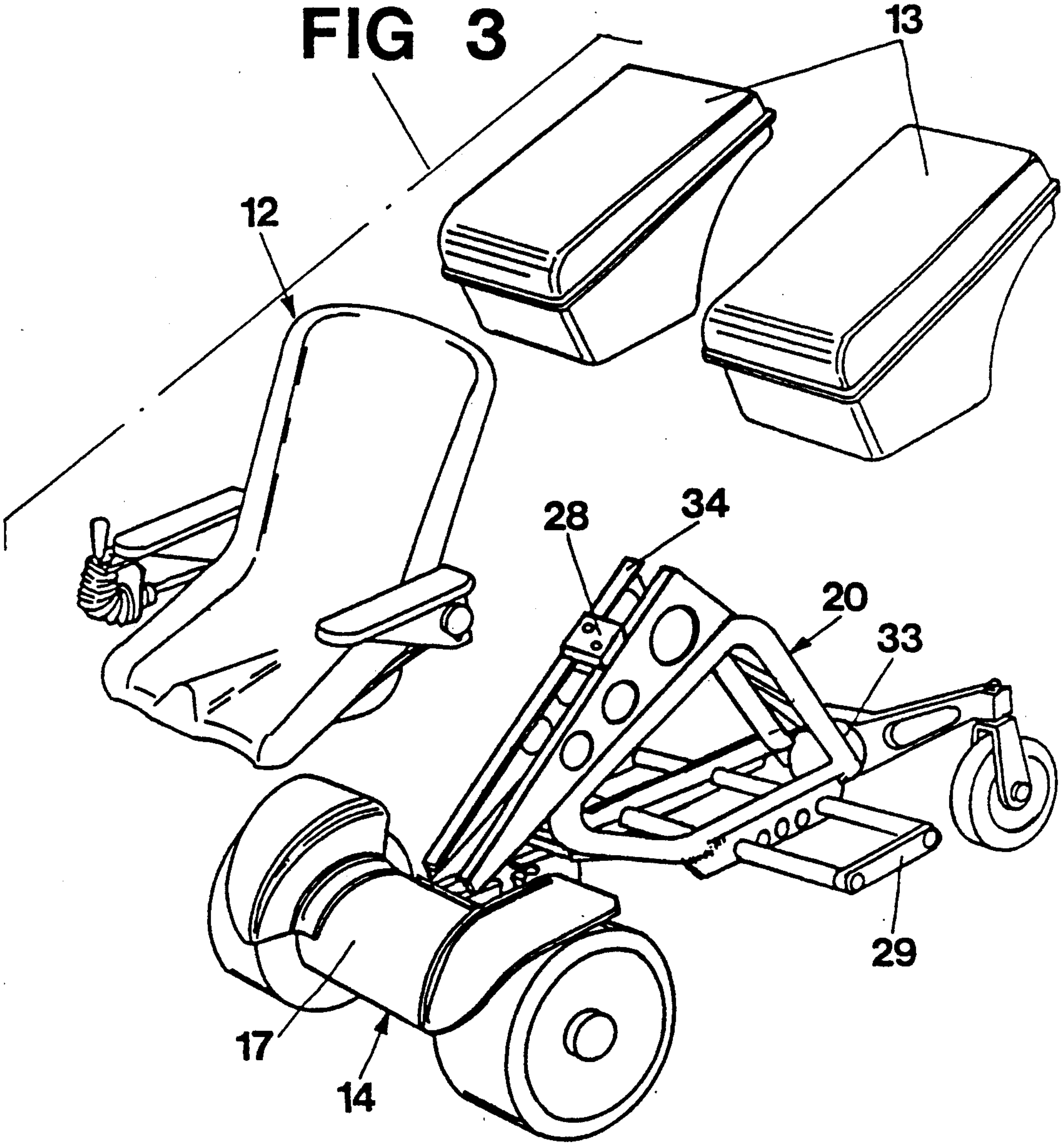
FIGS. 3 and 4 show views analogous with FIG. 2 of two modified embodiments.

The embodiment according to FIG. 3 differs from the proceding embodiment in that the beam 20 is designed as a steel tube frame, which is equipped with an inclined guide 34, along which the connecting device 28 of the seat module 12 is displaceable. The guide 34 is so arranged, that it extends over the servo motors 17 of the front wheel pair unit 14, whereby the chair in its foremost position is situated at such a low level, that the child can pick up objects from the floor.

Figure 4:
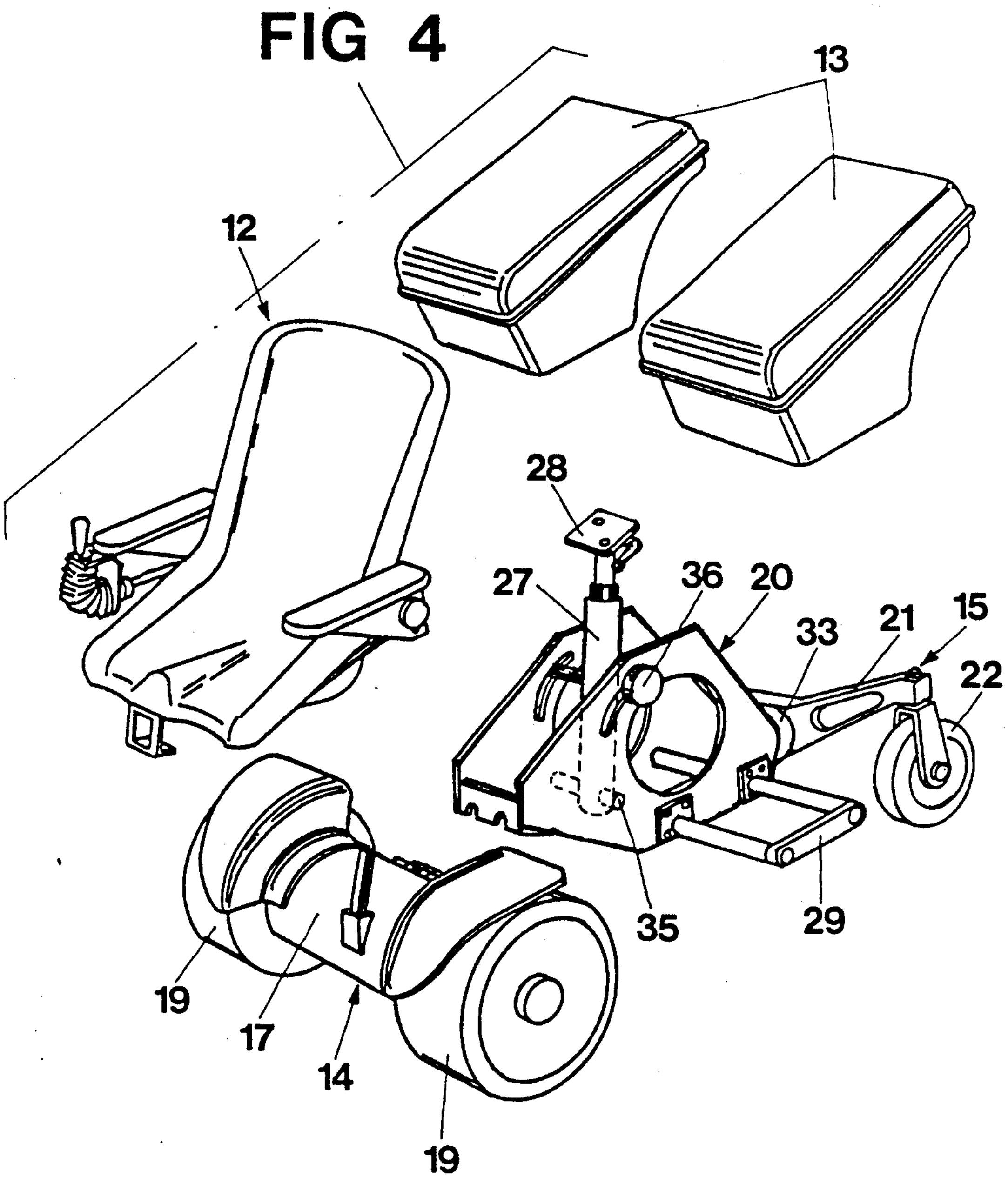

In the embodiment according to FIG. 4 the beam 20 is constituted by a sheet metal structure, by which the column 27 is tiltable to different inclined positions about a shaft journal 35 and is arrestable in such different positions by means of an arresting means 36. The rearmost wheel pair unit 15 also in this embodiment is pivotable in relation to the beam 20 about a bearing 33.

Figure 5:
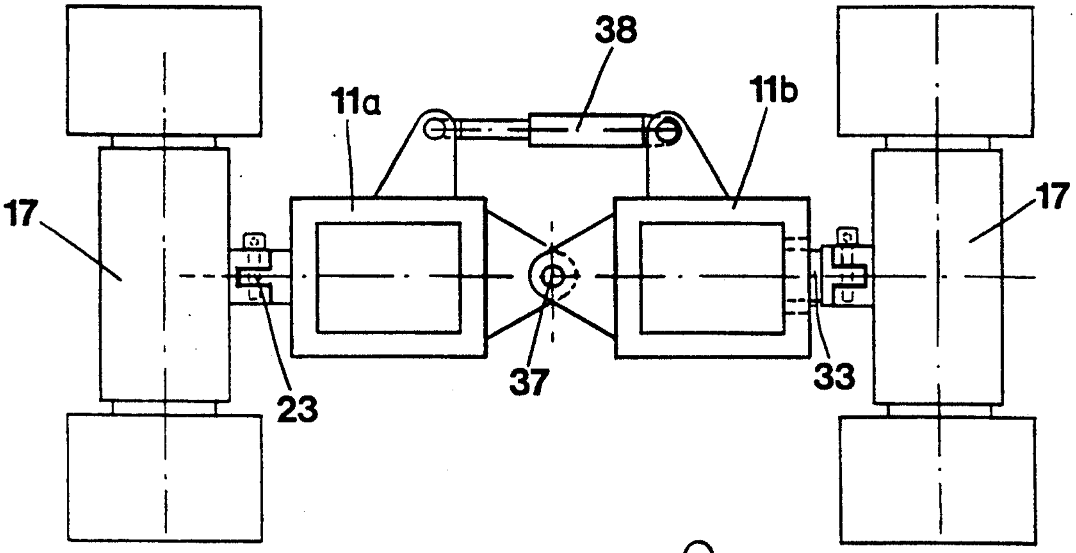
FIGS. 5 and 6 show in views from underneath and from the side a further modified embodiment of the wheel chair according to the invention.
Figure 6:
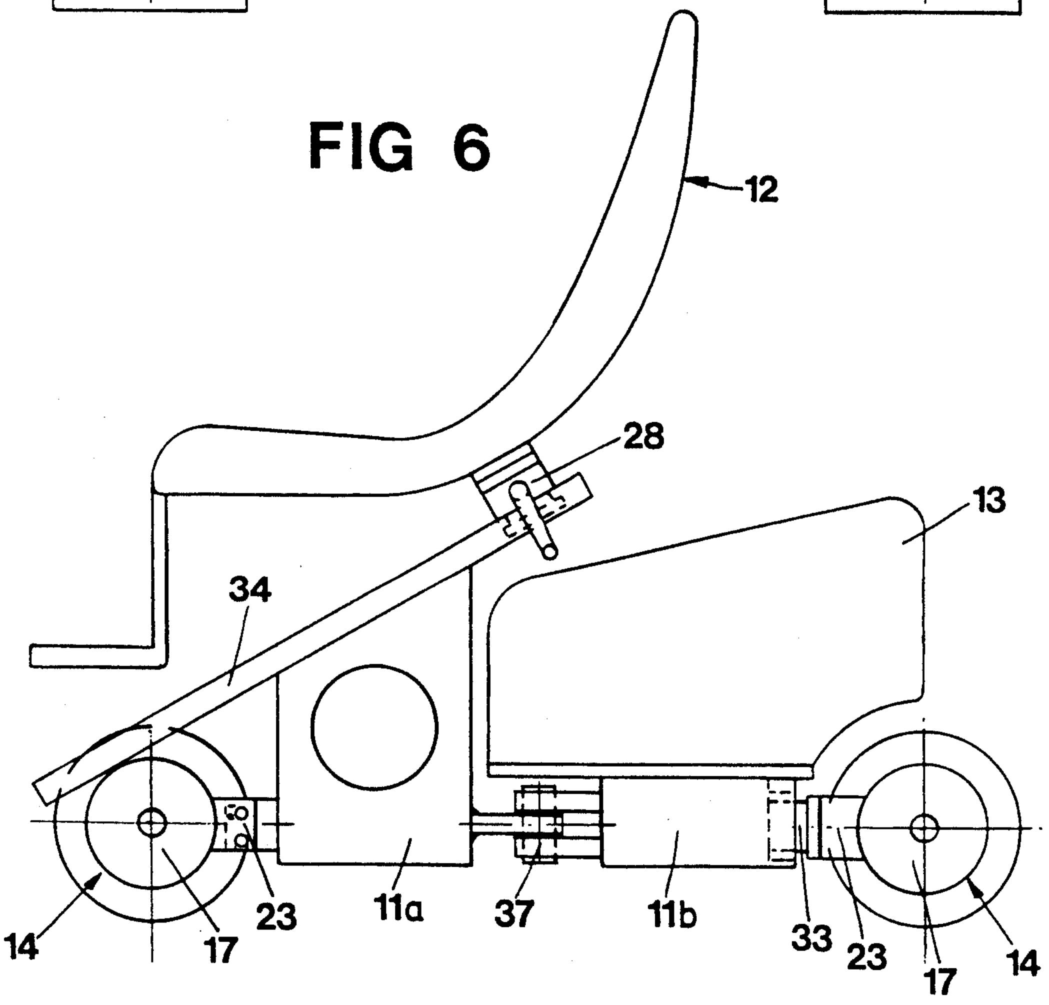

In certain cases it may be necessary to use four wheel drive, which can be obtained by providing a drive unit 16 at both wheel pair units 14 and 15. This is shown in the embodiment according to FIGS. 5 and 6, wherein the beam of the chassis module 11 is two-part, whereby between the parts 11A and 11B is provided a hinge joint 37 formed as a so called waist steering. Between the chassis parts 11A and 11B is provided an actuator 38, which is spaced apart from the pivot center of the hinge joint 37 and adapted to provide mutual rotation between the two chassis parts 11A and 11B.

The vehicle according to this embodiment is like the preceeding embodiments provided with a bearing 33 about which one of the wheel pair units 14 is pivotable about a horizontal shaft. The foremost chassis part 11A is furthermore equipped with an inclined guide 34 for supporting the seat 12 of the vehicle and providing a height adjustment therefore.

As the wheel chair is subdivided into modules it is possible concurrently with the physical development of the child but also in view of the development of the child's handicap, to adapt each separate module to the prevailing situation. The module structure furthermore results in that each separate part will have rather low weight and be easy to handle and can be carried by one person. Also when transported e.g. in a passenger's car the collapsible design is of particular advantage, and this also applies to the situation when any module should become defective or need service.

The invention is not limited to the embodiments shown but a plurality of variants are possible within the scope of the appended claims.

It is thus completely within the scope of the invention to combine structural details from one embodiment with corresponding details from another embodiment, but also a combination of details from different variants are possible.

We claim:

1. A power driven vehicle for disabled, comprising a motor driven chassis module, a seat module and an accumulator module, the chassis module incorporating two wheel pair units which are disconnectable from each other; the wheel pair units comprising a front wheel unit and a rear wheel unit, the front wheel unit comprising two steering and drive units each acting individually upon one wheel, and the rear wheel unit comprising a central beam, one end of the beam being separably connectable to the first wheel unit, the other end of the beam having a yoke pivotally supported transversely to the longitudinal direction of the vehicle; the rear wheel unit having at its free ends wheels supported in bearings; the seat module being centrally separably arranged on the beam; the accumulator module being separably attached on both sides of the beam, between the two wheel pair units.

2. A vehicle as claimed in claim 1, wherein a vertical heigth adjustable column is also vertically and pivotally supported on the beam, the column having a free end which is fitted with a connecting device for detachable connection of the seat module, and the column is positionable in different inclined positions.

3. A vehicle as claimed in claim 2, wherein the column incorporates an actuator for raising and lowering the seat module.

4. A vehicle as claimed in claim 1, wherein the beam has two lateral sides, on both lateral sides of the beam are loop-shaped attachments for supporting one detachable accumulator box each, and a respective accumulator box on each of the attachments.

5. A vehicle as claimed in claim 1, wherein on the beam is provided a guide, the guide being inclined down towards the drive unit a connecting device of the seat module is displaceable along the guide, such that in its foremost position, the connecting device is situated mainly just above the first wheel unit.

6. A vehicle as claimed in claim 1, wherein the beam of the chassis module comprises two parts, and a hinge connecting the two parts.

* * * * *